US005770654A

United States Patent [19]
Blatz

[11] Patent Number: 5,770,654
[45] Date of Patent: Jun. 23, 1998

[54] POLYAMIDE COMPOSITIONS TOUGHENED WITH WASTE PLASTICIZED POLYVINYLBUTYRAL

[75] Inventor: Philip Strubing Blatz, Wilmington, Del.

[73] Assignee: E. I. du Pont de Nemours and Company, Wilmington, Del.

[21] Appl. No.: 822,577

[22] Filed: Mar. 20, 1997

Related U.S. Application Data

[63] Continuation of Ser. No. 135,244, Oct. 13, 1993, abandoned.
[51] Int. Cl.[6] .................................................... C08L 77/00
[52] U.S. Cl. ........................... 525/179; 525/58; 525/178; 525/180; 525/183
[58] Field of Search ..................................... 525/178, 179, 525/183, 180

[56] References Cited

U.S. PATENT DOCUMENTS

| | | | |
|---|---|---|---|
| 3,626,026 | 12/1971 | Fukumura et al. | 260/857 |
| 4,248,977 | 2/1981 | Wertz | 525/58 |
| 5,281,674 | 1/1994 | Klaiber et al. | 525/281 |
| 5,332,774 | 7/1994 | Klang et al. | 524/377 |

*Primary Examiner*—Edward J. Cain

[57] ABSTRACT

A composition which is a uniform blend of 50–90 weight % of a polyamide melt-processable within the temperature range of 180°–210° C. and 50–10 weight % of recovered plasticized polyvinylbutyral, optionally also containing a small amount of an elastomeric ethylene copolymer carrying pendant succinic anhydride groups, has high impact strength and good flexural modulus. The polyamide in these compositions forms the matrix, and the plasticized polyvinylbutyral and any elastomer present form the dispersed phase. Such compositions have good barrier properties and are useful, among others, in applications where good toughness is required, for example, in packaging subjected to rough handling.

16 Claims, 1 Drawing Sheet

POLYAMIDE COMPOSITIONS TOUGHENED WITH WASTE PLASTICIZED POLYVINYLBUTYRAL

This is a continuation of application Ser. No. 08/135,244, filed Oct. 13, 1993 now abandoned.

BACKGROUND OF THE INVENTION

This invention relates to novel polyamide compositions reinforced with waste plasticized polyvinylbutyral.

Polyvinylbutyral (sometimes hereinafter abbreviated to PVB) is a well-known resin commonly employed as the interlayer between two glass sheets in automotive safety glass constructions. Chemically, polyvinylbutyral is a derivative of polyvinyl alcohol in which a portion of pendant hydroxyl groups is converted to acetal groups by reaction with butyraldehyde. Usually, about 20–25% of the original hydroxyl groups remain free. The polyvinyl alcohol from which PVB is made is itself made by hydrolysis of polyvinyl acetate, which hydrolysis theoretically can be either complete or partial. Polyvinyl alcohol used in the manufacture of PVB normally is hydrolyzed to the extent of at least 99%. Since PVB is quite brittle, it is customary to plasticize PVB for use in safety glass manufacture.

Safety glass for automotive applications is made by laminating, under elevated temperature and pressure conditions, an assembly of two outer sheets of glass and a core sheet of PVB. Following lamination, excess PVB sheet extending beyond the glass sheets is trimmed off. Automotive safety glass frequently is tinted, especially blue, in order to prevent excessive heating of vehicle interiors and to increase the efficiency of air conditioning. Colorless PVB trim can be recycled, but tinted trim cannot be recycled, so that it normally is either incinerated or buried. The first solution is rather undesirable because of carbon dioxide generation, which produces greenhouse effect, while the second solution only exacerbates the shortage of existing secure landfill facilities.

It, therefore, would be highly desirable to provide a higher value, less environmentally harmful plasticized PVB recovery method, especially for tinted PVB.

SUMMARY OF THE INVENTION

According to the present invention, there is provided a composition consisting essentially of a uniform blend of about 50–90 weight percent of a polyamide melt-processable at a temperature within the range of about 180°–270° C.; 50–10 weight percent of recovered plasticized polyvinylbutyral, the amount of plasticizer in said recovered polyvinylbutyral being about 15–35% by weight; and 0–10 weight percent of an elastomer which is either an ethylene copolymer with at least one other α-olefin or an EPDM rubber, said elastomer having pendant succinic anhydride groups; said blend comprising a polyamide matrix, and a dispersed phase consisting of plasticized polyvinylbutyral together with any elastomer having pendant succinic anhydride groups that may be present;

with a proviso that when an elastomer having pendant succinic anhydride groups is not present, the amount of polyamide is 50–75 weight percent, and the amount of plasticized polyvinylbutyral is 25–50 weight percent; said blend having a notched Izod impact strength of at least 200 J/m and a flexural modulus of at least 1000 MPa;

but when an elastomer having pendant succinic anhydride groups also is present, the amount of polyamide is 70–85 weight percent, and the amount of plasticized polyvinylbutyral is 10–25 weight percent; said blend having a notched Izod impact strength of at least 500 J/m and a flexural modulus of at least 1700 MPa;

in either case, the total amount of the recited components always being 100 weight percent.

DETAILED DESCRIPTION

Figure 1:
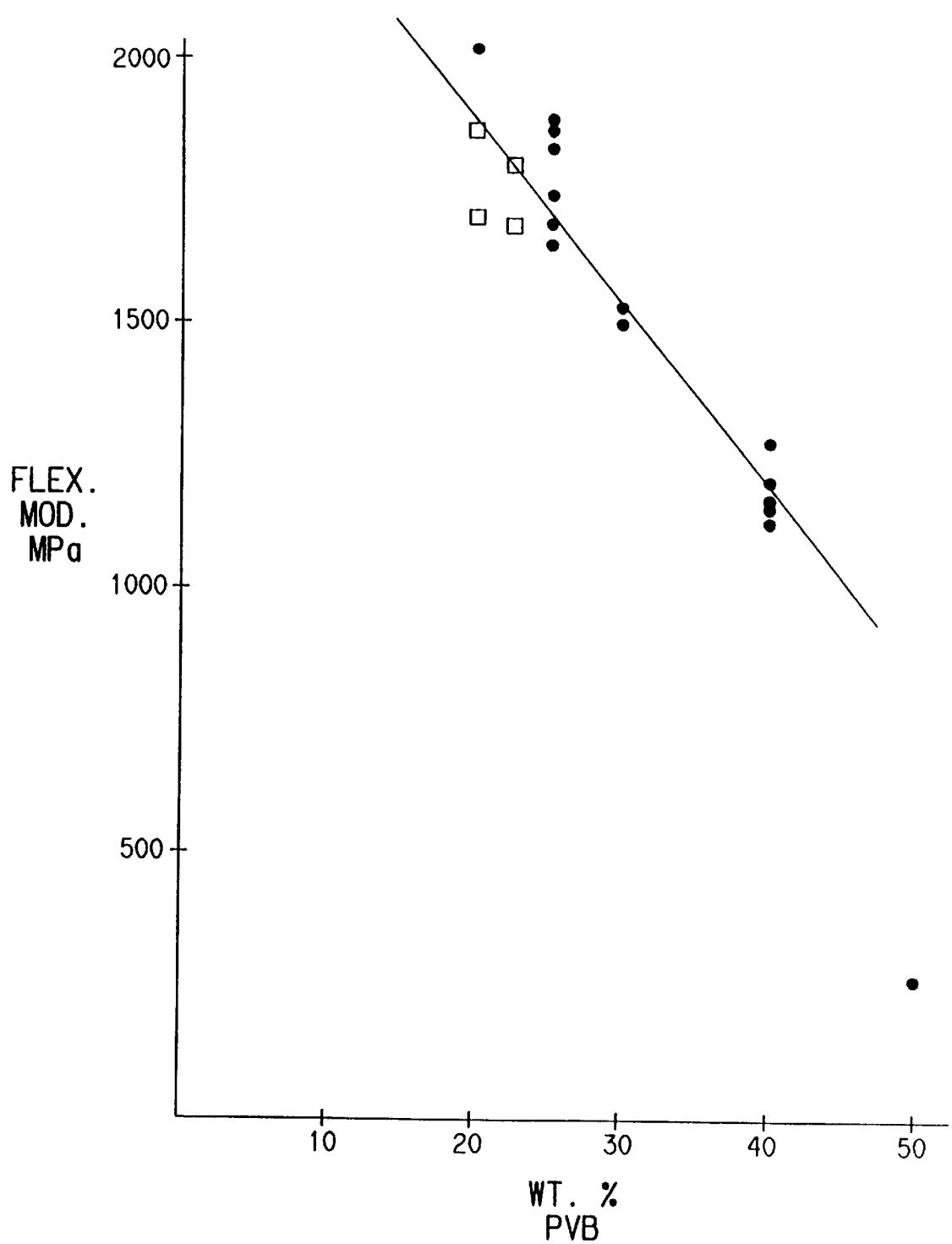
FIG. 1 represents a plot of flexural modulus vs. percentage of recovered plasticized PVB, plus any succinic anhydride group-carrying elastomer, in blends with nylon.

Commercial PVB normally used as the automotive safety glass interlayer usually has a degree of polymerization of about 380–800, a weight average molecular weight, $M_w$, of about 90,000–105,000, and a number average molecular weight, $M_n$, of about 50,000–60,000. In addition to plasticizers, such PVB contains light stabilizers, antioxidants, and pigments. Additives other than plasticizers are present in only small amounts, no more than a fraction of one percent each. The percentages of recovered PVB recited in the above Summary of the Invention include the plasticizer and such additional additives already present in that material. Any further additives that may be added to the blend are not comprised within the percentages of components recited in the Summary of the Invention.

Representative plasticizers include, e.g, dioctyl phthalate, tetraethylene glycol di(n-heptanoate), dihexyl adipate, dibutyl benzyl phthalate, and triethylene glycol di(2-ethyl butyrate).

Unplasticized PVB would not be suitable in this invention since such material is very brittle and incompatible with polyamides. It is, therefore, surprising that plasticized PVB is a very good toughening agent for polyamides.

Suitable polyamides, which can be either partially crystalline or amorphous, include, e.g., certain aliphatic polyamides known as nylons, especially, nylon 6; nylon 11; nylon 12; nylon 6,10; nylon 6,12; and nylon 12,12; copolymers ε-caprolactam with heaxamethylenediamine and adipic acid; and copolymers of other aliphatic or aromatic diamines with aliphatic or aromatic diacids. Exemplary diamines are hexamethylenediamine, 2,2,4-trimethyl-1,6-hexanediamine, 2-methyl-1,5-pentanediamine, pentamethylenediamine, m-xylylenediamine, naphthylenediamines, and methylenebis(cyclohexanediamine). Suitable aromatic diacids include, e.g., isophthalic and terephthalic acid and mixtures thereof, and alkyl-substituted isophthalic and terephthalic acids. As used herein, the term "copolymer" includes not only dipolymers but also terpolymers and higher copolymers. Many aliphatic polyamides are described in U.S. Pat. No. 4,800,189 to Deak. Amorphous polyamides are characterized by lack of melting point (first order transition) in differential scanning calorimetry (DSC).

Blending of polyamides with recycled plasticized PVB can be accomplished in any suitable mixing or blending device, including high shear mixers such as Haake mixers, Banbury blenders, Farrell mixers, and extruders. Extruders can be single screw or twin-screw, where the screw can have varying degrees of severity. Blending is conducted at a temperature within the range of about 180°–270° C., preferably at a temperature of 200°–260° C. Temperatures higher than 270° C. are not recommended because of risk of thermal degradation of the components. Nylon 6,6 is not a suitable polyamide because of its high melting point of about 255° C., which would require a blending temperature above 270° C. Plasticized PVB is quite sensitive to high temperatures, so that care must be taken in the upper region of the specified temperature range to avoid thermal degradation of this material, for example, by reducing the shear or the residence time of the materials in the blending equipment. One skilled in the art would be able to determine the optimum shear and temperature conditions by running at most two or three experiments.

The blends of the present invention are uniform and homogeneous. The term "homogeneous" does not mean that the blends form a single phase, because there is a matrix and a dispersed phase, but that certain of their properties are additive, as can be demonstrated by plotting the values of such property as a function of blend composition. Such additive properties decrease or increase in a linear fashion.

Plasticized PVB has not been known heretofore as a toughening agent for polyamides. In order to have a good toughening action, the amount of plasticized PVB often must be quite high, about 30–50 weight %. But at those high levels of PVB, the flexural modulus of the blend sometimes decreases to values below what is considered acceptable for engineering resins. It has been found that when the blend contains, in addition, a small amount of a compatibilizing agent such as a succinic anhydride group-carrying polymer, the amount of plasticized PVB can be reduced below 25 weight % without adversely affecting the toughness of such blends. Those blends containing a small amount of compatibilizing agent and a reduced amount of plasticized PVB also have very good flexural moduli.

Suitable compatibilizing agents are, i.a., functionalized elastomers such as maleic anhydride-grafted or fumaric acid-grafted elastomers such as, for example, ethylene/propylene rubbers, low density ethylene/butene-1 copolymers, low density ethylene/octene-1 copolymers, and EPDM rubbers. EPDM rubbers are well known. This abbreviation stands for an ethylene/propylene/diene monomer copolymer, where the diene has only one polymerizable double bond. The diene monomer can be, e.g., 1,4-hexadiene, norbornadiene, etc. Grafted EPDM elastomers suitable in this invention are described, i.a., in U.S. Pat. Nos. 3,884,282 and Re 31680 to Caywood.

The blends of the present invention can find utility in a number of industrially important applications. For example, polyamides are known for their barrier properties, especially to oxygen and organic liquids. For this reason, they are used in the form of film or thermoformable sheet (i.e., a sheet that can be formed into shapes below its melt temperature) as packaging materials. Frequently, polyamide may form an inner barrier layer in a multilayer structure, where the outer layers are made of less expensive materials such as, e.g., polystyrene, a polyolefin, or an ionomer resin. Such multilayer structures are normally produced by coextrusion. Blends of polyamides with recovered plasticized PVB according to this invention would be suitable as the barrier layer in such structures.

Polyamide sheets can be thermoformed but, because of the usually high degree of crystallinity of the material, this can be done within narrow temperature limits. The blends of the present invention should be more readily thermoformable within broader temperature ranges because such compositions have a lower degree of crystallinity, exhibit a longer induction time for crystallization, and crystallize more slowly.

Although barrier properties of the nylons toughened with recovered plasticized PVB according to the present invention will be somewhat lower than those of pure nylons, they still will be better than those of materials such a polyolefins or polystyrene and will be adequate for many uses. Because those materials are considerably tougher than pure nylons, they should be suitable in applications where improved toughness is specifically required, for example, in packaging subjected to rough handling. These materials also would have a cost advantage over conventional materials such as blends of semicrystalline nylons with amorphous nylons.

This invention is now illustrated by the following examples of certain representative embodiments thereof, where all parts, proportions, and percentages are by weight, unless otherwise indicated. All weights and measures not originally obtained in SI units have been converted to SI units and rounded off where appropriate. All percentages are by weight, except as indicated.

The polyamide was in all cases pelletized commercial nylon 6 available from Allied-Signal Company under the trademark CAPRON®. PVB was recovered, colored trim material, in flake form, having dimensions of about 6.35× 6.35×(0.5 to 2.0) mm. Recovered plasticized PVB flake is quite tacky and tends to agglomerate. Because of that, it is practical to dust it with an inorganic or organic powder to prevent agglomeration. In this case, PVB flake was dusted with 1% of powdered high density polyethylene. This PVB was made from polyvinyl alcohol obtained from fully hydrolyzed polyvinyl acetate, leaving about 23% of the initial hydroxyl groups free, i.e., unconverted to ketal groups. The plasticizer was tetraethylene glycol di(n-heptanoate), which was present in an amount of about 23% of recovered PVB. Small amounts of dyes, pigments, and stabilizers were also present in this material.

All mechanical properties were measured on the dry as molded test samples

EXAMPLES 1–4 AND CONTROL 1

Nylon 6 was CAPRON® 8207, a high viscosity, extracted material, primarily sold for film extrusion. This resin and recovered plasticized PVB were blended in a Haake laboratory batch mixer. The ingredients were added to the mixer at 15 rev/min at 230° C. When the solids melted completely, the speed was increased to 100 rev/min, and the mixer was set to stop after 10 minutes. The melt was then removed and pressed into a sheet. The sheet was cut into strips, which were dried overnight at about 90° C. and compression-molded into test bars at about 230° C. The results are presented in Table 1, below.

TABLE 1

| Example | Nylon 6 (%) | PVB (%) | Melt Flow at 230° C. (dg/min) | Flex. Mod. (MPa) | Notched Izod Impact Str. at R.T. (J/m) |
|---|---|---|---|---|---|
| 1 | 90 | 10 | 9.4 | 2070 | 102.5 |
| 2 | 80 | 20 | 8.3 | 1965 | 100.9 |
| 3 | 70 | 30 | 8.7 | 1411 | 1347 |
| 4 | 60 | 40 | 11.5 | 1012 | 1370 |
| Contr. 1 | 100 | 0 | 11.0 | 2880 | 40.6 |

The above results show that the toughness of this nylon 6, as shown by the notched Izod data, increases upon addition of plasticized PVB, but the increase is very significant with high levels of 30–40% of PVB, while the flexural modulus at this high level of PVB still is very satisfactory for many end uses.

EXAMPLES 5–7

The same nylon 6 and recovered plasticized PVB were used, and mixing was conducted in the same equipment and under the same conditions, except that it was stopped after 5 minutes. The results are presented in Table 2.

TABLE 2

| Example | Nylon 6 (%) | PVB (%) | Melt Flow at 230° C. (dg/min) | Flex. Mod. (MPa) | Notched Izod Impact Str. at R.T. (J/m) |
|---|---|---|---|---|---|
| 5 | 80 | 20 | 5.60 | 1882 | 201 (97–318) |
| 6 | 70 | 30 | 8.50 | 1593 | 657 (188–1126) |
| 7 | 60 | 40 | 10.4 | 1138 | 598 (70–1126) |

This Table shows that shorter mixing time results in compositions having lower toughness. Furthermore, the blending uniformity is poor, as can be seen from the scatter of the notched Izod data, obtained on duplicate samples.

EXAMPLES 8–10 AND CONTROL 2

In these examples, lower melt viscosity nylon 6, CAPRON® 8202, was used for injection molding. In all the compositions, the amount of plasticized PVB was 40%. It can be seen from Table 3, below, that toughness is improved to a greater extent when more complete mixing is achieved, either by increasing the mixing time or the rotor speed (and thus also the shear).

TABLE 3

| Example | Mixing Condition (Rev/min) | Time (min) | Melt Flow at 230° C. (dg/min) | Flexural Modulus (MPa) | Notched Izod at Room Temp. (J/m) |
|---|---|---|---|---|---|
| 8 | 100 | 5 | 9.8 | 1133 | 304.8 (st. dev. 249.3) |
| 9 | 100 | 10 | 5.7 | 1163 | 431.8 (st. dev. 66.2) |
| 10 | 200 | 5 | 7.5 | 1169 | 506.6 (st. dev. 29.9) |
| Contr. 2 | | | 23.2 | 2684 | 59.8 |

EXAMPLES 11–14

Here, nylon 6 and recovered plasticized PVB were preblended in a 50:50 ratio, and the preblended concentrates were diluted with additional nylon 6 to make nylon-enriched blends. The concentrate of Example 11 was used to make the final blend of Example 13, and the concentrate of Example 12 was used to make the final blend of Example 14. CAPRON® 8202 was the nylon 6 used in all the examples. Mixing time in all runs was 10 minutes. The results are presented in Table 4, below.

TABLE 4

| Example | Composition | Amt. (%) | Rotor Speed. (rev/min) | Melt Flow at 230° C. (dg/min) | Flex. Mod. (MPa) | Notched Izod (J/m) |
|---|---|---|---|---|---|---|
| 11 | Nylon 6 | 50 | 100 | 8.5 | | |
|    | PVB | 50 | | | | |
| 12 | Nylon 6 | 50 | 200 | 9.9 | | |
|    | PVB | 50 | | | | |
| 13 | Nylon 6 | 50 | 100 | 5.2 | 1746 | 613.9 (St. dev. 347.0) |
|    | Blend of | 50 | | | | |
|    | Ex. 11 | | | | | |
| 14 | Nylon 6 | 50 | 100 | 6.1 | 1857 | 96.1 (St. dev. 82.2) |
|    | Blend of | 50 | | | | |
|    | Ex. 12 | | | | | |

This table shows that the higher rotor speed (and shear) used for making the concentrate of Example 12 resulted in a blend that on dilution with additional nylon 6 produced the composition of Example 14 that had a much lower notched Izod impact strength than the composition of Example 13 made from the concentrate of Example 11 prepared at a milder shear. Accordingly, when working with concentrates, care must be taken not to expose the blends overall to excessive shear conditions. One skilled in the art would be able to readily determine the mixing conditions best suited for maximum toughness.

EXAMPLES 15–18

Additional blends were made from preblended concentrates of the same nylon 6 as used in Examples 11–14, above. All the blends were made at 230° C. at 100 rev/min. The results are presented in Table 5.

TABLE 5

| Example | Composition | Amt. (%) | Melt Flow at 230° C. (dg/min) | Flex. mod. (MPa) | Notched Izod (J/m) |
|---|---|---|---|---|---|
| 15 | Nylon 6 | 50 | | | |
|    | PVB | 50 | | | |
| 16 | Nylon 6 | 50 | | | |
|    | PVB | 50 | | | |
| 17 | Blend of Ex. 15 | 40 | 5.30 | 2012 | 228.5 (st. dev. 133.5) |
|    | Nylon 6 | 60 | | | |
| 18 | Blend of Ex. 16 | 30 | 5.85 | 2308 | 143.6 (st. dev. 53.9) |
|    | Nylon 6 | 70 | | | |

Comparing the results obtained for Examples 17 and 18 with the results earlier obtained in Examples 1 and 2, one will note that, for low levels of PVB (20% or less), toughness of the blends made from the concentrates was higher than that of the direct blends.

EXAMPLES 19–22

In these examples, all the blends, containing 60% of nylon 6 and 40% of PVB, were made in a 30 mm twin-screw extruder, extruded into strands, and pelletized. The pellets were vacuum-dried overnight at about 90° C. and injection-molded at a melt temperature of 230° C. into test samples. For good toughness, extrusion must be conducted under high shear conditions. For a given screw configuration, blends having the highest toughness were produced at the highest screw speeds and material throughputs. Although high temperatures were reached, there was no apparent degradation because of the short residence times. The results are presented in Table 6, below.

TABLE 6

| Example | Extr. Rate kg/hr | Screw speed rev/min | Melt temp. °C. | Melt flow at 230° C. dg/min | Flex. mod. Mpa | Notched Izod J/m* |
|---|---|---|---|---|---|---|
| 19 | 5.4 | 150 | 250 | 11.2 | 1496 | 170.3 (125.4–175.6) |
| 20 | 5.7 | 300 | 263 | 10.7 | 1460 | 226.3 (62.5–392.3) |
| 21 | 11.4 | 150 | 240 | 10.3 | 1723 | 187.9 (52.8–322.4) |
| 22 | 11.2 | 300 | 269 | 10.4 | 1196 | 456.4 (86.5–826.3) |

*The notched Izod values in parentheses were the lowest and the highest values obtained in six replicate determinations Because of more efficient blending and short residence times, extruder blending is preferred to blending even in high speed mixers, which require longer residence times.

EXAMPLES 23–25

The following blends were prepared in a Haake batch mixer set at a temperature of 230° C. and 150 rev/min. In Examples 23 and 24, the blends were nylon 6/PVB/EPDM elastomer containing 1.75% of succinic anhydride groups, 77:18:5. In Example 25, the blend consisted of nylon 6/plasticized PVB/EPDM elastomer containing 1.75% of succinic anhydride groups, 80:15:5. The results are presented in Table 7, below.

TABLE 7

| Example | Mixing Time (min) | Max. Temp. (°C.) | Melt Flow (dg/min) | Flex. Mod (MPa) | Notched Izod at R..T. (J/m)* |
|---|---|---|---|---|---|
| 23 | 5 | 248 | 6.8 | 1800 | 870(192) |
| 24 | 10 | 250 | 6.0 | 1717 | 950(131) |
| 25 | 10 | 251 | 5.7 | 1806 | 490(242) |

*Notched Izod values in parentheses represent standard deviations

The above results show that high notched Izod impact strengths can be obtained by reducing the amount of plasticized PVB and adding a functionalized polymer which can act as a compatibilizer. These blends have much higher flexural moduli than binary nylon/PVB blends with the same nylon content.

EXAMPLES 26–45

The following examples demonstrate the uniformity of the blends by showing that the value of a physical property such as, e.g., flexural modulus varies in a linear fashion as a function of the amount of recovered plasticized PVB in the blend. This is illustrated by FIG. 1, which is a plot of flexural modulus vs weight percent of recovered plasticized PVB in the blend. Those blends were prepared in a Haake laboratory mixer, operated for either 5 or 10 minutes. In some experiments, a fraction of a percent of a stabilizer and of an antioxidant also was added. Further, in Examples 26, 27, 29, and 30, an EPDM rubber carrying 1.75% of pendant succinic anhydride groups also was present. The blend compositions and flexural moduli are presented below in Table 8.

TABLE 8

| Example | Recovered PVB (%) | EPDM Rubber (%) | PVB + EPDM Rubber (%) | Flex. Mod. (MPa) |
|---|---|---|---|---|
| 26 | 15 | 5 | 20 | 1882 |
| 27 | 15 | 5 | 20 | 1737 |
| 28 | 20 | 0 | 20 | 2013 |
| 29 | 18 | 5 | 23 | 1800 |
| 30 | 18 | 5 | 23 | 1717 |
| 31 | 25 | 0 | 25 | 1875 |
| 32 | 25 | 0 | 25 | 1732 |
| 33 | 25 | 0 | 25 | 1862 |
| 34 | 25 | 0 | 25 | 1662 |
| 35 | 25 | 0 | 25 | 1717 |
| 36 | 25 | 0 | 25 | 1834 |
| 37 | 30 | 0 | 30 | 1544 |
| 38 | 30 | 0 | 30 | 1489 |
| 39 | 30 | 0 | 30 | 1558 |
| 40 | 40 | 0 | 40 | 1165 |
| 41 | 40 | 0 | 40 | 1172 |
| 42 | 40 | 0 | 40 | 1207 |
| 43 | 40 | 0 | 40 | 1138 |
| 44 | 40 | 0 | 40 | 1138 |
| 45 | 50 | 0 | 50 | 244 |

FIG. 1, is a plot of flexural modulus as a function of recovered plasticized PVB in the blend. Data points represented by open squares correspond to the runs in which a smaller amount of functionalized EPDM rubber was present, in addition to recovered plasticized PVB, while the remaining points correspond to the runs in which no such rubber was present. The straight line was traced as an approximate interpolation of the data points. It can be seen that flexural modulus is an additive property, which indicates that the blends are indeed homogeneous. It is noted that at the 50% level of recovered plasticized PVB, the flexural modulus of the blend was very low (Example 45). This may be due to a different morphology of that blend, namely, the presence of two co-continuous phases, rather than a matrix and a dispersed phase.

I claim:

1. Composition consisting essentially of a uniform blend of about 50–90 weight percent of a polyamide melt-processable at a temperature within the range of about 180°–270° C.; 50–10 weight percent of recovered plasticized polyvinylbutyral, the amount of plasticizer in said recovered polyvinylbutyral being about 15–35% by weight; and 0–10 weight percent of an elastomer which is either an ethylene copolymer with at least one other α-olefin or an EPDM rubber, said elastomer having pendant succinic anhydride groups; said blend comprising a polyamide matrix, and a dispersed phase consisting of plasticized polyvinylbutyral together with any elastomer having pendant succinic anhydride groups that may be present;

with a proviso that when an elastomer having pendant succinic anhydride groups is not present, the amount of polyamide is 50–75 weight percent, and the amount of plasticized polyvinylbutyral is 25–50 weight percent; said blend having a notched Izod impact strength of at least 200 J/m and a flexural modulus of at least 1000 MPa;

but when an elastomer having pendant succinic anhydride groups also is present, the amount of polyamide is 70–85 weight percent, and the amount of plasticized polyvinylbutyral is 10–25 weight percent; said blend having a notched Izod impact strength of at least 500 J/m and a flexural modulus of at least 1700 MPa;

in either case, the total amount of the recited components always being 100 weight percent.

2. A melt-processable, injection-moldable composition consisting essentially of a uniform blend of
- (A) about 50 to about 90 weight percent of a polyamide melt-processable at a temperature within the range of about 180° C. to about 270° C. and
- (B) about 10 to about 50 weight percent of recovered plasticized polyvinylbutyral which contains about 15 to about 35 weight percent of a plasticizer therefor, wherein the weight percents of the polyamide and the recovered plasticized polyvinylbutyral are based on the total weight of the uniform blend, and the weight percent of the plasticizer is based on the total weight of the recovered polyvinylbutyral.

3. A composition as recited in claim 2 wherein the polyamide is selected from the group consisting of nylon 6; nylon 11; nylon 12; nylon 6,10; nylon 12,12; and copolymers of e-caprolactam with hexamethylenediamine and adipic acid.

4. A composition as recited in claim 3 wherein the polyamide is nylon 6.

5. A composition as recited in claim 2 made by direct blending of all components in a blending or mixing device at a temperature within the range of about 180° C. to about 270° C.

6. A composition as recited in claim 5 wherein blending is carried out at a temperature within the range of about 200° C. to about 260° C.

7. A composition as recited in claim 2 in the form of a film or a thermoformable sheet.

8. A composition as recited in claim 2 in the form of a layer in a multilayer structure.

9. A composition as recited in claim 2 wherein the uniform blend further includes 0 to about 10 weight percent of an elastomer selected from the group consisting of any ethylene copolymer with at least one other α-olefin and an EPDM rubber, said elastomer having pendant succinic anhydride groups.

10. A composition as recited in claim 9 wherein the polyamide is selected from the group consisting of nylon 6; nylon 11; nylon 12; nylon 6,10; nylon 12,12; and copolymers of e-caprolactam with hexamethylenediamine and adipic acid.

11. A composition as recited in claim 10 wherein the polyamide is nylon 6.

12. A composition as recited in claim 9 made by direct blending of all components in a blending or mixing device at a temperature within the range of about 180° C. to about 270° C.

13. A composition as recited in claim 12 wherein blending is carried out at a temperature within the range of about 200° C. to about 260° C.

14. A composition as recited in claim 9 wherein the elastomer is an EPDM rubber.

15. A composition as recited in claim 9 in the form of a film or a thermoformable sheet.

16. A composition as recited in claim 9 in the form of a layer in a multilayer structure.

* * * * *